Figure 3:
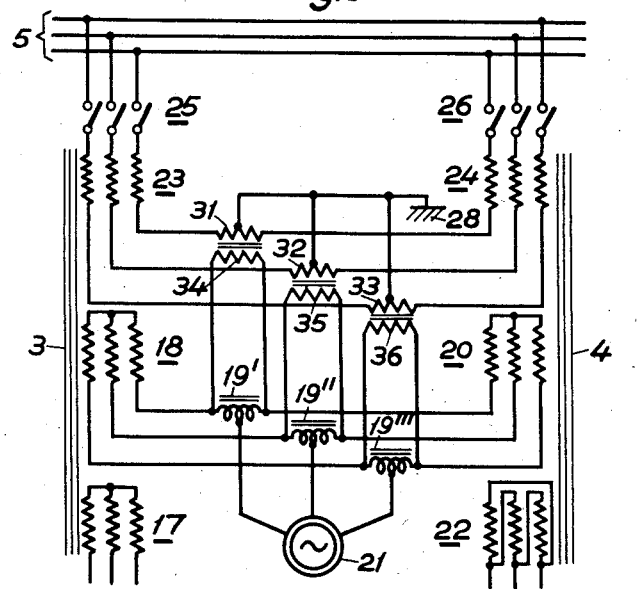

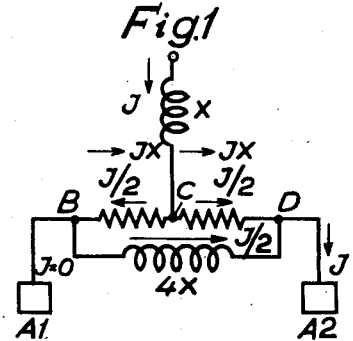
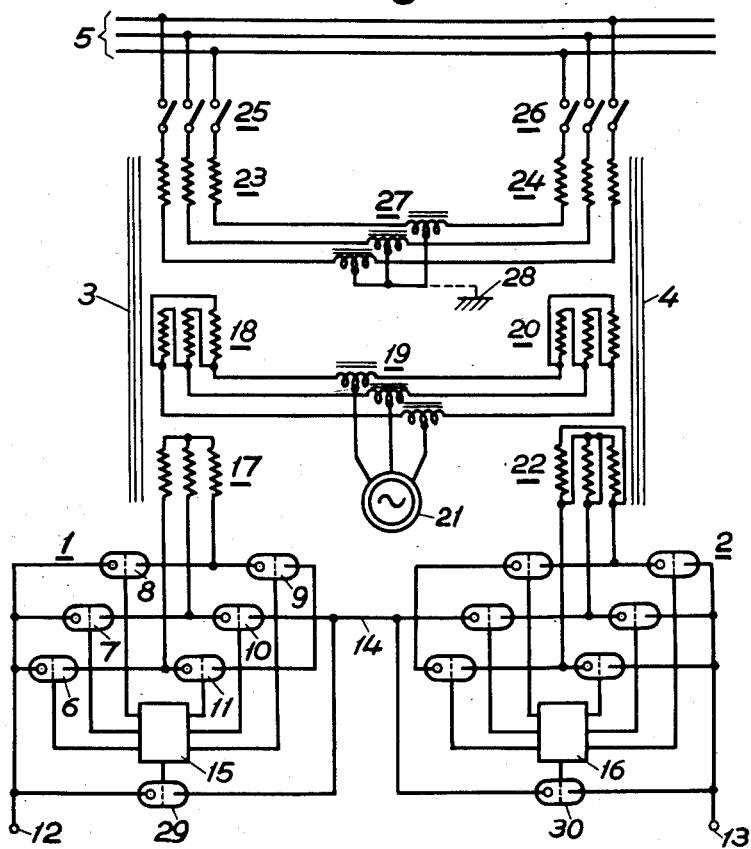

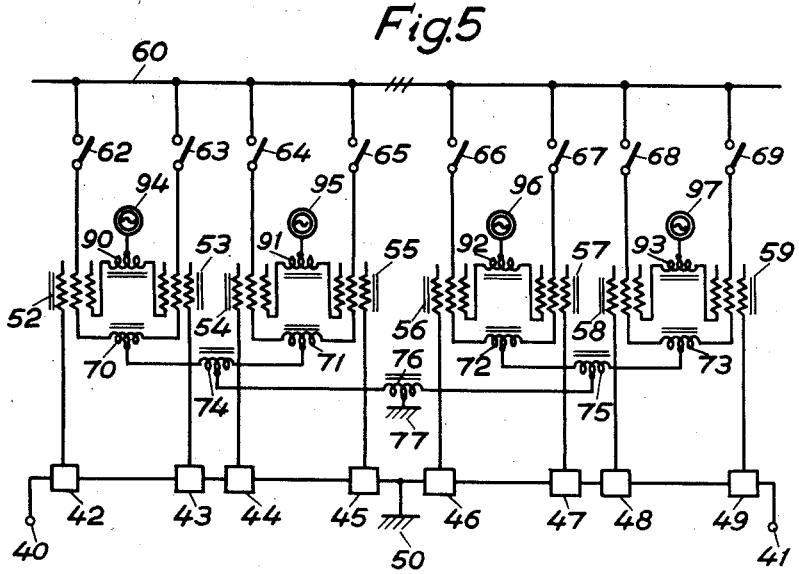
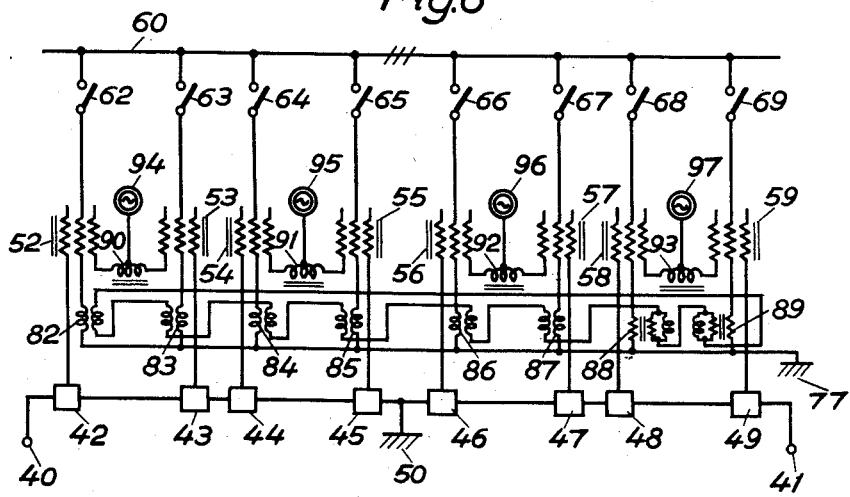

United States Patent Office 2,899,628
Patented Aug. 11, 1959

2,899,628

MEANS FOR OPERATING SEVERAL CO-OPERATING CONSTITUENT STATIC CURRENT CONVERTERS

Erich Uhlmann, Ludvika, Sweden, assignor to Allmanna Svenska Elektriska Aktiebolaget, Vasteras, Sweden, a corporation of Sweden Application January 30, 1958, Serial No. 712,241

Claims priority, application Sweden February 1, 1957

8 Claims. (Cl. 321—27)

The present invention refers to means for operating at least two constituent current converters each being connected to a converter transformer to which two alternating current networks are connected to separate windings (line windings).

One of said alternating current networks always constitutes the network feeding or fed by the current converters and the other is usually a synchronous machine arranged to supply reactive power. Depending on the number of co-operating constituent converters one or several synchronous machines may be connected to the plant.

It has been proposed to design the primary winding of the converter transformer for the voltage of the synchronous machine and to arrange an auxiliary transformer between this relatively low tension network and the network which is feeding or being fed. In this case the active power has to be transformed twice, which involves considerable disadvantages, such as high plant costs and great losses. In some cases it is desirable to connect several constituent converters which are displaced in phase relation to each other, to the low tension network. The commutation in one constituent converter will then influence the curve shape of the voltages of the other constituent converters. This may lead to difficulties especially in inverter operation. Different ways of overcoming these difficulties are suggested in the patent specification 2,621,319 and their purpose is to obtain such an inductive coupling of the primary sides of the converter transformers that a compensation is attained for the reaction between the current converters.

In order to avoid the drawbacks which are associated with the arrangement of an auxiliary transformer, it has also been proposed that converter transformers are provided with a primary winding for each of the two alternating current networks. In this case steps must be taken to compensate the mutual reaction between the constituent converters and regard must be paid to the properties of the two alternating current networks. The specification 2,621,319 shows, for instance in Fig. 16, a solution of this problem for a special case. In Fig. 16 the leakage reactances associated with the different transformer windings have been used as inductive coupling elements in order to produce the compensation. Owing to these circumstances it will not always be possible to perform the transformer construction.

The above mentioned arrangements have only been described when used in connection with constituent converters displaced in phase in order to compensate for mutual reaction of the constituent converters during the commutation. The same arrangements, however, are also justified on the operation of constituent converters connected to equal phases. On such operation the constituent converters commutate simultaneously and no disturbances of the kind mentioned earlier can arise. In this case regard must be paid to such disturbances as arc-backs and arc-throughs. The influence of such disturbances can be eliminated by using a compensating reactor between the converter transformers of two constituent converters. The compensating reactor will get such an influence that the constituent converters connected to it will operate as if they were connected to separate networks.

This condition will now be explained with reference to Fig. 1 of the accompanying drawing. In this figure X indicates the reactance of a network which is connected to a central tapping C on the compensating reactor B—D. The operation is most easily understood if the reactor B—D is assumed to be divided in the ideal transformer windings B—C and C—D and the reactor 4X connected in parallel with them. A constituent converter A1 is connected to the point B and a constituent converter A2 to the point D. Assuming that a disturbance arises in the constituent converter A2, which involves a disturbing current I; this current will be superimposed on the normal operating current, which is not indicated in the figure. At the point C, the current I is divided and I/2 goes to B and through the reactor 4X to D and I/2 goes from C to D, resulting in the current I. The current I/2 through the reactor 4X causes the voltage drop 2IX directed from B to D. A voltage IX will then arise between B and C and a voltage IX between C and D. A voltage drop, which is equal to that which the disturbing current causes in the network, will be subtracted in the current circuit including the undisturbed constituent converter and added in the current circuit including the disturbed constituent converter. Thus an undisturbed constituent converter gets no voltage and can consequently be regarded as disconnected from the network.

Because of the described conditions the known arrangements have a favourable influence irrespective of whether the operation is made with constituent converters connected to equal or unequal phases. Commutation conditions such as overlap angle, commutation time, commutation margin, in a constituent converter, will thus be independent of the number of operating constituent converters connected to equal phases, as each constituent converter behaves as if it were connected to an independent network.

The above mentioned drawbacks are avoided, according to the present invention, in that one of the alternating current networks is connected to one of the line windings of all the converter transformers and that at least one of the remaining alternating current networks is connected to another line winding of two of the converter transformers via a compensating reactor and that steps are taken to prevent the voltage across said compensating reactor from being short-circuited via the series connected leakage reactances existing between different line windings on said two converter transformers.

The converter transformers will thus, according to the invention, contain three main windings, one which may be called line winding, one which is connected to the synchronous machine and may be called machine winding and one, which is connected to the current converter valves and may be called valve winding. Two constituent converters, which are displaced in phase at a certain angle in relation to each other, can suitably co-operate. The machine windings of the two converter transformers can then be connected via a compensating reactor to a common synchronous machine, which covers the reactive power requirements of the current converters and may entirely or partly cover the reactive power requirements of the network. When a commutation takes place between two phases in one of the constituent converters a short-circuit arises between these phases and then, on the one hand a voltage is induced in that part of said compensating reactor which supplies commutation power and, on the other hand, a voltage of the same direction is induced in that part of the compensating reactor which is connected to the non-commutating constituent converter or converters. Said voltages can be short-circuited via the series connected leakage reactances of the converter transformers, i.e. those which exist between the machine and line winding of each converter transformer. Such a short-circuit must however be avoided and the present invention deals with different steps for preventing this.

On the accompanying drawings Figs. 2–6 show diagrammatically, different forms of the invention.

In Fig. 2, 1 and 2 indicate two constituent converters, each one of which being connected via converter transformers 3 and 4 to a network 5. In the three-phase diagram each constituent converter consists of six current valves which for the constituent converter 1 are indicated 6—11. The anodes of the current valves 6—8 are connected to a direct current terminal 12 and the cathodes of the current valves 9—11 are connected to the anodes of three of the current valves of the constituent converter 2, via the connection 14, so that the constituent converters are connected in series. The cathodes in the other three-valve group of the constituent converter 2, are connected to the other direct current terminal 13 of the converter. If necessary, the constituent converters 1 and 2 may also be connected in parallel. The grids of the current valves in each constituent converter are connected to grid control devices 15 and 16. The constituent converter 1 is connected to a valve winding 17 on the converter transformer 3. A machine winding 18 of this transformer is connected via a compensating reactor 19 to a machine winding 20 on the converter transformer 4. The three phases of a synchronous machine 21 are connected to central tappings on the separate phase reactors of the compensating reactor 19. The constituent converter 2 is connected to the converter transformer 4 via a valve winding 22 on this transformer. A line winding 23 of the converter transformer 3 and a line winding 24 of the converter transformer 4 are connected to the network 5 via circuit breakers 25 and 26 respectively. The line windings 23 and 24 are connected together via a compensating reactor 27. The central tappings of the phase reactors of said compensating reactor are connected together and if necessary connected to ground 28.

By the arrangement of the compensating reactor 27, the voltage, which at commutation in some of the constituent converters 1 or 2, arises across the compensating reactor 19, is prevented from being short-circuited over the leakage reactances between the machine winding 18 and the line winding 23 in series with the line winding 24 and the machine winding 20. The form shown in Fig. 2 can be modified so that the compensating reactors 27 and 19 are arranged on common cores. As they will have a common magnetic circuit in this case, their total dimensions can be reduced. Such an arrangement involves a considerable saving in cost, especially as the compensating reactor 27 can have large dimensions.

By the arrangement of the compensating reactors 27 and 19, it is also possible to operate each constituent converter 1 and 2 separately. Usually each constituent converter has a by-pass valve 29 and 30 respectively, which is blocked, under normal operation. The by-pass valve which belongs to a constituent converter which is to be taken out of operation, is however, de-blocked. The circuit breakers 25 and 26 are used in order to disconnect the respective converter transformer.

A further simplification of the arrangement in Fig. 2, can be obtained according to Fig. 3, in which the compensating reactor 27 has been replaced by a current divisor 31, 32, and 33 between the line windings 23 and 24. The middle points of the current divisors are connected to ground 28. A secondary winding 34, 35, 36 on each current divisor shunts the phase reactors 19', 19'', 19''' of the compensating reactor 19. By this arrangement only one reactor with one winding and one transformer in each phase, is necessary. Apart from this the operation will be the same as for the form shown in Fig. 2. In Fig. 3, only the valve windings 17 and 22 have been illustrated but not the constituent converters.

If the possibility of disconnecting one of the converter transformers is given up, the arrangement shown in Fig. 3 can be modified by excluding the secondary windings 34—36. In spite of this the arrangement operates at the blocking of one of the constituent converters.

Figure 4:
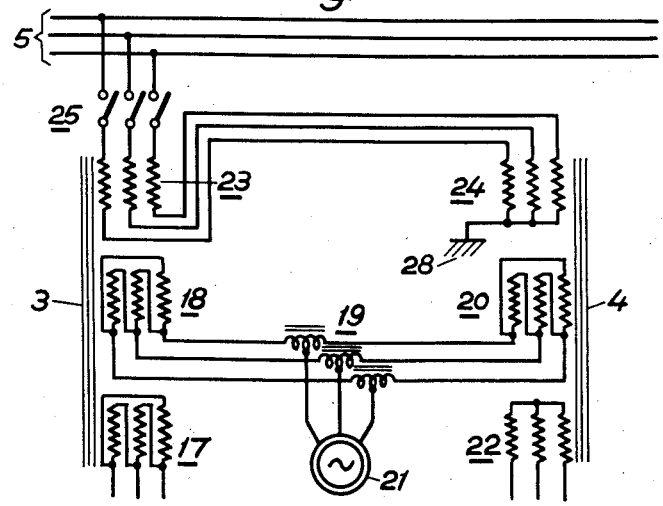

The last mentioned connection is equivalent to a connection according to Fig. 4, where the line windings 23 and 24 on both converted transformers are series connected and connected to ground 28. In both the last mentioned cases the possibility is eliminated of producing a closed circuit via the leakage reactances between the machine and line windings of the converter transformers. For the sake of clarity the constituent converters have been excluded even in Fig. 4. It may be suitable to arrange both the converter transformers over each other on a common core.

The forms described above show arrangements for preventing a disturbance in one constituent converter influencing another constituent converter and the shown connections concern the use of constituent converters connected to unequal phases. The Figs. 5 and 6 show that the invention can be used advantageously when constituent converters, connected to equal phases, co-operate. Between D.C. poles 40 and 41 in Fig. 5, eight constituent converters 42–49 are connected in series. A ground connection 50 may be arranged to this series connection. For the sake of clarity Fig. 5 is shown as a one-line diagram where two phase conductors have been excluded as well as the connections of the transformer windings. Each constituent converter 42–49 is connected to a valve winding on each of their converter transformers 52–59. The line windings of these transformers are connected on one side to a phase conductor winding 60 via circuit breakers 62–69 respectively and on the other side they are joined in pairs via the compensating reactors 70—73. The centre tappings of the reactors 70 and 71 are connected to a compensating reactor 74 and the centre tappings of the reactors 72 and 73 are connected to a compensating reactor 75. The centre tappings of the reactors 74 and 75 are joined, via a compensating reactor 76, the centre tapping of which is grounded at 50. The machine windings of the converter transformers are joined in pairs via compensating reactors 90—93, the centre tappings of which are connected to synchronous machines 94—97 respectively.

The two constituent converters 42 and 43 are connected to unequal phases and so are the following pairs of converter transformers. The constituent converters which have even numbers however, may be connected to equal phases and this is also possible with the constituent converters having uneven numbers. Disturbances caused by the commutation in one of the constituent converters 42 and 43 cannot influence the other owing to their connection via the compensating reactors 70 and 90. In addition, the group comprising the constituent converters 42 and 43, will be independent of the operating conditions of the group, which comprises the constituent converters 44 and 45, owing to the arrangement of the compensating reactor 74. Disturbances in one of these groups do not actuate the other. In a corresponding way a group, which comprises the constituent converters 42—45, is divided from a group which comprises the constituent converters 46—49 by the arrangement of the compensating reactor 76.

Instead of separate sources for reactive power, one or several of them may be common to different groups of constituent converters, by connecting the centre tappings of some of the compensating reactors 90—93 in pairs via further compensating reactors, to the centre tappings of which the above sources can be connected.

Fig. 6 shows a plant of corresponding size to Fig. 5.

The line windings of every converter transformer 52–59 are grounded at 77 via a reactor 82–89 respectively, for each one of them, instead of being grounded via compensating reactors. Every such reactor has a secondary winding and all the secondary windings are series connected in such a way that a disturbance, which arises in one constituent converter, will be prevented from influencing the remaining constituent converters. In a similar way as in Fig. 5 the converter transformers 52–59 have their machine windings joined in pairs via compensating reactors 90—93, the centre tappings of which are connected to synchronous machines 94—97, respectively. In Fig. 6 a modification has been shown for the reactors 88, 89, which are situated at the far right and each one of them has been replaced by a transformer. In this case it is necessary for a reactor to be connected in parallel with the secondary winding of the transformers according to the figure.

The connections which are shown in the Figs. 5 and 6 operate in the same way but the form according to Fig. 6 is simpler to perform and involves lower costs.

I claim as my invention:

1. In a direct current transmission system, a converter station comprising at least two constituent static converters, a converter transformer for each converter, two separate alternating current networks, at least two windings (line windings) on each converter transformer, one of said alternating current networks being connected to one of said line windings of all converter transformers, a compensating reactor, said compensating reactor being connected between the second of said alternating current networks and the second line winding on two of the converter transformers, means for preventing the voltage across said compensating reactor being short-circuited via the series connected leakage reactances existing between the said two line windings on each of said two converter transformers.

2. Means according to claim 1, in which the first mentioned alternating current network is connected to the same converter transformers as the last mentioned alternating current network, via a compensating reactor.

3. Means according to claim 2 in which the two compensating reactors belonging to two converter transformers have a common magnetic circuit for each phase.

4. Means according to claim 1 in which the first mentioned alternating current network is connected to the same converter transformers as the last mentioned alternating current network via a current divisor.

5. Means according to claim 4, in which said current divisor is provided with a secondary winding for each phase, which is arranged to shunt corresponding phase reactors in the last mentioned alternating current network.

6. Means according to claim 1, in which the line windings of two converter transformers, the second line windings of which are joined via a compensating reactor, are connected in series between the network and earth.

7. Means according to claim 1, in which the windings of the two converter transformers, which are connected to the first mentioned alternating current network, are joined via a compensating reactor and that the remaining converter transformers of the plant are, in a corresponding way, connected together in pairs via similar compensating reactors, and that the centre tappings of said last mentioned compensating reactors are joined via further compensating reactors which in turn are joined in a corresponding way until only one compensating reactor remains, the tapping of which being earthed and that in each pair of converter transformers the second line windings are connected to the second alternating current network via compensating reactors.

8. Means according to claim 1, in which the windings of every converter transformer, which are connected to the first mentioned network, are grounded via reactance elements, which are provided with secondarily connected reactance elements, which are series connected, in such a way that a disturbance in one constituent converter will not influence any of the remaining constituent converters and that in each pair of converter transformers the second line windings are connected to the second alternating current network via compensating reactors.

References Cited in the file of this patent

UNITED STATES PATENTS 2,621,319    Uhlmann _____ Dec. 9, 1952